United States Patent Office 2,880,220
Patented Mar. 31, 1959

2,880,220

PRODUCTION OF OMEGA BROMO COMPOUNDS

James D. Johnston, Baton Rouge, La., assignor to Ethyl Corporation, New York, N.Y., a corporation of Delaware No Drawing. Application April 26, 1956
Serial No. 580,726

2 Claims. (Cl. 260—408)

This invention relates to a new process for the manufacture of omega-bromoaliphatic carboxylic acids and carboxylic derivatives thereof and more particularly, to the production of such compounds from lower molecular weight bromo compounds.

The omega-haloalpihatic carboxylic acids and derivatives of the carboxy function are potentially valuable materials suitable for use as chemical intermediates in the preparation of such varied materials as amino acids, omega thiobutyric acid, alkylphenoxy acids or esters, dibasic acids, omega-amino aliphatic acids, polyesters, plasticizers, synthetic lubricants, polyester diols, lactones, lactams, pentamethylene diamine, polymer intermediates and many other products. Their intrinsic value stems from their difunctionality i.e. bromo and carboxylic substituents, and a chemical structure easily converted to a wide spectrum of extremely valuable commercial products. These omega-bromoacids have largely been regarded as laboratory curiosities because of their relative unavailability as well as their high cost. This is particularly true of those omega-bromoacids having four or more carbon atoms and although a demand has existed for these products, a suitable process for their manufacture has heretofore not been provided.

It is an object of the present invention to provide a process for the production of omega-bromoaliphatic acids and esters or anhydrides thereof. Another object is to produce products of the above type without the use of elemental bromine. A still further object is to provide a process for the production of omega-bromoaliphatic carboxylic acids and/or esters or anhydrides thereof from a lower molecular weight bromo compound. Still another object is to provide useful chemical products by reactions involving the use of the omega-bromo compounds of this invention as chemical intermediates. Other objects will appear hereinafter.

It has been found that omega-bromoaliphatic carboxylic acids or esters or anhydrides thereof can be prepared by the reaction of a bromoacetic carboxylic compound with a polymerizable olefinic compound in the presence of a catalyst. The process generally comprises reacting bromoacetic acid, an ester or anhydride thereof with an alphaolefinic compound, preferably ethylene, at superatmospheric pressures and at temperatures of 25°–300° C. in the presence of a catalyst, generally a source of free radicals such as for example, a peroxide-type activator. The process produces omega-bromoaliphatic carboxylic acids having at least 4 carbon atoms in the acid radical chain or their corresponding esters or anhydrides.

The results obtained by the present process are indeed unexpected in view of the prior art. It is known that chloroacetic acids or its esters will react with olefin hydrocarbons in the presence of free radicals to form a complex mixture of alphachloro acids or esters. It appears that when a hydrogen atom is attached to an alpha-carbon atom bearing a chlorine substituent, said hydrogen substituent is the labile, reactive atom and the chlorine atom is virtually inactive. Hence not only are low yields of product obtained but the reaction also leads to the formation of complex unseparable mixtures of higher molecular weight materials which do not have omega or terminal halogen atoms remote from the carboxylic part of the molecule.

I have now discovered that if bromine is substituted for chlorine as the halogen substitutent on the alpha-carbon atom of acetic acid, and esters or anhydrides thereof, the reactivity of the halo carboxy compound towards the mono-olefin is remarkably enhanced so that vastly improved yields of the desired products are obtained. More significantly, in contrast to the chloro derivatives, the bromine substituents are now the labile, reactive atoms resulting in products having a terminal halogen atom remote from the carboxy functional group. The present process also now permits the selective production of desired omega-bromo compounds of varying molecular weight and the recovery and use of these bromo compounds as valuable chemical intermediates.

The reaction of this invention can be represented as follows:

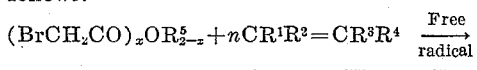

$$(BrCH_2CO)_xOR^5_{2-x} + nCR^1R^2 = CR^3R^4 \xrightarrow{\text{Free radical}}$$
$$[Br(CR^1R^2-CR^3R^4)_nCH_2CO]_xOR^5_{2-x}$$

where $R^1R^2R^3R^4$ are the same or different and selected from the group consisting of hydrogen and halogen atoms, $R^5$ is selected from the group consisting of hydrogen atom, aliphatic, aryl and aralkyl radicals, $x$ is an integer from 1 to 2 and $n$ is an integer generally from 1 to 20. Among the aliphatic radicals we generally prefer to employ alkyl or hydrocarbon substituted alkyl radicals having up to about 12 carbon atoms. When aryl radicals are employed it is usually preferred to employ carbocyclic radicals and derivatives thereof having up to about 12 carbon atoms.

The foregoing reaction may be effected by various routes employing a wide variety of reaction conditions, reactant proportions, reaction apparatus, free radical initiators, modes of combining reactants and the like. In all of these routes however the preparation of any desired product or mixture of products i.e. definition of $n$, depends to a large degree upon the particular relationships between the various variables of reactant proportions, temperature and pressure employed and hereinafter discussed. While the exact mechanism leading to the desired results obtained in this invention is not known with certainty, it is believed that it is the peculiar combination of these variables employed herein which effects the desired result.

The particular details of carrying out any one embodiment of the present invention can vary appreciably from others dependent upon whether a solvent is or is not employed or whether the free radical source is introduced in toto in the initial step of the reaction or in increments throughout the reaction period so as to maintain more uniform control over the reaction. In one generally applicable procedure, the apparatus consists of a stirred pressure reactor equipped with means for supplying and removing heat and for the introduction of liquid and solid reactants. A liquid charge of the bromoacetic acid, ester or anhydride together with an inert organic solvent and a free radical source or catalyst e.g. an acyl peroxygen compound, is placed in the reactor which is then closed and the contents agitated. The olefin, e.g. ethylene, is admitted under pressure so that the desired pressure will be achieved at the reaction temperature which is generally somewhere between 25 and 300° C. Pressures of up to 1000 atmospheres, and more preferably between 20 and 150 atmospheres, are generally employed. The particular reaction conditions which are employed depend upon the reactants used, the average molecular weight of the product desired and on the number of different products desired in the product mixture. Generally higher pressures and lower temperatures result in an increase in the average molecular weight and complexity of the product mixture. Conversely, in the preferred embodiments of this invention a highly selective production of desired omega-bromo compounds is obtained using relatively low reaction pressures i.e. 20–150 atmospheres, and reaction temperatures in the range of 80–140° C. These preferred conditions also result in the production of a product mixture generally containing not more than about four compounds as the major components thereof, these compounds being easily recoverable from the reaction mixture.

The minimum reaction initiation temperature will depend primarily upon the particular catalyst employed with the initiation of the reaction, when gaseous olefins are employed, being indicated by a drop in pressure registered on a gage attached to the reactor. During the course of the reaction it is generally desirable to maintain the reaction pressure e.g. ethylene pressure, at a constant level by adding more ethylene from an external storage facility. When operating a batch process it is preferred that the catalyst or activator be added in increments to the reactor since in this manner the reaction proceeds more uniformly and better reaction rates and more uniform products are obtained. The reaction is generally run for a period of 0.25 to 5 hours and preferably 1 to 5 hours, or until the initator is essentially exhausted and the termination of the reaction is indicated by the cessation of ethylene absorption. Longer reaction times i.e. up to 20 hours, can be employed but are generally not required in the present process to obtain the desired products or yields. In the continuous operation of this process, reaction or contact periods of less than 0.25 hour can be employed as the reactants flow through the reaction zone. This shortened reaction period usually results in low conversions but high yields are obtained by recycling unreacted materials to the reaction zone. The reaction mixture is allowed to cool, removed from the reactor and worked up to isolate the resulting products. Generally the bromacetic carboxylic substrate is employed in excess and a considerable proportion of it remains unreacted at the end of the reaction. The solvent and unreacted bromo compounds are distilled away from the less volatile products and can be recycled for subsequent reactions so as to obtain exceptionally high yields from the reactants employed. Generally, the product consists of a mixture of structurally homologous compounds differing from one another by one or more units of the olefin. The proportion of any one of the homologous members can be varied by varying the reaction process as heretofore noted. While fractional distillation is the generally preferred route for recovering the products, other methods such as fractional crystallization, sublimation, selective extraction and the like can be employed where practical or desirable.

While the above general procedure for conducting the processes of this invention refers to a batch operation, in many instances improved operation can be obtained by employing a continuous reaction system wherein the two reactants, catalyst and where desired, a solvent, are continuously and separately delivered to a reaction zone and where products of the reaction are continuously discharged to an appropriate recovery system.

The invention is illustrated by the following examples, all parts being by weight:

*Example I*

A mixture of 405 parts of methyl bromoacetate, 350 parts of n-pentane and 2.4 parts of benzoyl peroxide were added by gravity flow through a dip tube into a stainless steel autoclave equipped with stirring, heating and cooling means. The feed valve through which the liquid entered the dip tube was closed and the reactor was purged by alternately pressurizing with 200 to 250 p.s.i.g. ethylene and then venting the ethylene. This purging procedure was repeated three times. The reactor was then pressurized to 375 p.s.i.g. with ethylene while maintaining the reaction mixture at a temperature of 90 to 110° C. The initiation of the reaction was characterized by a rapid pressure drop in the reactor caused by the absorption of ethylene during the reaction. A reaction pressure of 350–400 p.s.i.g. was maintained by admitting ethylene to the reaction zone from a high pressure storage tank. The reaction was run for 2.25 hours after which time the cessation of any ethylene absorption indicated the end of the reaction. The reactor was cooled and the reaction mixture was forced out through the dip tube with the residual ethylene pressure. The solvent and unreacted methyl bromoacetate were flashed off and the residue fractionated under vacuum to yield three different products. Thus the residue was found to consist of 62 percent methyl gamma-bromobutyrate, 32 percent methyl epsilon-bromohexanoate and 3 percent methyl omega-bromo octanoate. The yield amounted to 5300 parts of total product per mole of initiator employed.

Comparable results are obtained when di-tertiary butylperoxide, hydrogen peroxide, lauroyl peroxide and cyclohexanone peroxide are employed as catalysts in this example in place of benzoyl peroxide.

*Example II*

The procedure of Example I was repeated with the exception that 1.2 parts of acetyl peroxide were employed in place of benzoyl peroxide and the reaction temperature was maintained at 70 to 85° C. for a reaction pressure of 650 to 800 p.s.i.g. The present example further distinguishes from Example I in that no solvent was employed. A product yield corresponding to 8900 parts of product per mole of initiator was obtained. The product obtained had the following production distribution: 57 percent methyl gamma-bromobutyrate, 24 percent methyl epsilon-bromohexanoate, 9 percent methyl omega-bromo octanoate and a residue consisting of higher molecular weight methyl omega-bromoesters.

*Example III*

The procedure of Example II was repeated with the exception that 500 parts of n-pentane was employed as a solvent and the reaction pressure was maintained at 200 to 250 p.s.i.g. A mixture of omega-bromoesters comparable in yield and product distribution to that of Example II was obtained. The product was fractionated and found to consist essentially of only three components having the following distribution: 50 percent of the methyl gamma-bromobutyrate and 29 percent of the methyl epsilon-bromohexanoate and the residue consisting essentially of the methyl omega-bromooctanoate.

*Example IV*

The procedure of Example I was repeated with the exception that 350 parts of n-pentane and 1.5 parts of di-tertiary butyl peroxide were employed and the reaction temperature was maintained at 130 to 140° C. and a reaction pressure of 550 to 600 p.s.i.g. was employed. After a reaction period of 2.0 hours the reaction product was fractionally distilled to yield approximately 43 percent gamma-bromobutyrate, 32 percent methyl epsilon-bromohexanoate, 4 percent methyl omega-bromooctanoate and a residue consisting of high molecular weight methyl omega-bromoesters.

Similar results are obtained when isooctane, mineral oil, hexane, cyclohexane, dioxane and tertiary butyl alcohol are employed as solvents in place of n-pentane in the process of Example IV.

*Example V*

A mixture of 230 parts of tertiary butyl-bromoacetate and 200 parts of n-hexane are placed in a stainless steel reaction vessel equipped with a stirrer, a thermometer, a feed tube and a reflux condenser. The reaction mixture is slowly heated to reflux temperature and a mixture of chlorotrifluoroethylene (50 parts) and benzoyl peroxide (1.2 parts) are slowly added to the refluxing reaction mixture. After a reaction period of about 7 hours the reaction is terminated by cooling the reacting reaction mixture and a very good yield of a product having the formula Br(CF$_2$—CFCl)$_n$CH$_2$COOC$_4$H$_9$ with the large proportion of product being $n=2$ product.

*Example VI*

The procedure of Example I is repeated with the exception that a comparable quantity of bromoacetic acid is employed in place of the methyl bromoacetate. A product distribution of the various omega-bromoacids comparable to those of the corresponding omega-bromoesters obtained in Example I is obtained.

Similarly, when the anhydride of bromoacetic acid is employed in place of bromoacetic acid in Example VI comparable results are obtained.

*Example VII*

The process of Example I is again repeated with the exception that the reaction is conducted using vinyl chloride in place of ethylene as the olefin and employing a reaction temperature of about 200° C. and a reaction pressure of 300 p.s.i.g. for a period of about 6 hours. The product, Br(CH$_2$CHCl)$_n$CH$_2$COOCH$_3$ was obtained in comparable yield and product distribution with respect to the value of $n$ as in Example I.

Similar results to those of Example VII are obtained when phenyl bromoacetate is employed in place of methyl bromoacetate.

As heretofore noted, the omega-bromo compounds of the present invention have great utility as synthetic intermediates in the preparation of useful chemical products. The following example demonstrates one such derived product.

*Example VIII*

A stainless steel reaction vessel equipped with a stirrer, reflux condenser, a Dry Ice trap, a feed tube and external heating means was charged with 100 parts of methyl-epsilon-bromohexanoate. The reaction mixture was heated to a temperature of 200° C. and maintained at that temperature for about 12 hours at the end of which time a substantial quantity of methyl bromide had been collected in the trap. The reactor contents were cooled and removed from the reaction zone and upon fractionation gave an excellent yield of a polyester having the formula Br[(CH$_2$CH$_2$)$_2$CH$_2$COO]$_m$CH$_3$ The process of the present invention can be carried out with olefinic compounds having the formula

CR$^1$CR$^2$=CR$^3$CR$^4$ where R$^1$R$^2$R$^3$R$^4$ can be the same and different and are selected from members of the group consisting of hydrogen and halogens. Examples of such olefins are ethylene, vinyl fluoride, vinyl chloride, vinyl bromide, vinyl iodide, vinylidene fluoride, vinylidene chloride, 1,1-dichloro-2,2-difluoroethylene, trichloroethylene, bromotrichloroethylene, chlorotrifluoroethylene, tetrafluoroethylene, tetrachloroethylene and the like. Generally of the halogen derivatives i.e. chloro, bromo, iodo or fluoro, the fluoroethylene derivatives are preferred as reactants because of the resultant high yields and excellent selective product distribution. Ethylene however is particularly preferred because of its ease of handling, low cost, excellent yields and the high degree of utility of the products obtained therefrom.

As heretofore noted, bromoacetic acid or esters or anhydrides thereof can be used in the practice of this invention. Any ester of bromoacetic acid can be employed particularly the aliphatic or aralkyl esters with alkyl esters being usually employed because of cheapness and ready availability. Examples of commonly employed alkyl groups are methyl, ethyl, propyl, butyl, amyl, tertiary butyl and the like. Thus a general formula for the bromo compounds can be given as

[BrCH$_2$CO]$_x$OR$^5_{2-x}$ where R$^5$ is selected from the group consisting of hydrogen, aliphatic, aryl and aralkyl organic radicals, and where $x$ is an integer from 1 to 2. The aliphatic groups can be cyclic, straight chain or branch chain and preferably radicals having less than about 12 carbon atoms and more preferably less than about 5 carbon atoms. Aryl and aralkyl radicals having up to about 12 carbon atoms are generally preferred when employing such ester substituents. The radicals can be substituted with any group which is not reactive with the olefin reactant or any other process reactant under the reaction conditions employed. Substituents such as, for example, halides, nitro, ethers and nitrile groups can be suitably employed.

The reaction of the present invention can be carried out over a wide range of temperatures, generally from about 25° to about 300° C. with about 60° to 200° C. and more preferably about 80° to 140° C. being employed when highly selective products are desired. Temperatures above 300° C. are to be avoided because at these higher temperatures decomposition of the free radical source is too rapid for greatest effectiveness to be realized. In general, the temperature employed will depend primarily on the free radical source employed as well as on the bromo compound used.

The pressure under which the reaction is carried out will generally depend upon the molecular weight of the particular product desired with superatmospheric pressure generally being desirable. This is particularly true in those cases where either of the reactants are gaseous at the reaction temperature. Under such circumstances superatmospheric pressure is then employed in order to achieve an appreciable concentration of the gaseous reactant in the system so as to cause the reaction to proceed at a desirable rate. If desired, however, the reaction can be carried out at pressures as low as atmospheric or as high as 1000 atmospheres with the preferred pressure range for the preferred reactants and desired products being between about 20 and 150 atmospheres. When operating at the preferred reaction conditions an excellent yield of a product of a desired degree of complexity i.e. not more than about four principal products, is obtained. Uniform pressure is maintained by continuous addition of the olefin compound to the reaction zone.

The process of the present invention can be conducted successfully in the presence of wide variety of reaction promoters or catalysts, particularly those compounds capable of undergoing thermal decomposition to yield free radicals. Such compounds include the peroxygen compounds, e.g., hydrogen peroxide, tertiary-butyl hydrogen peroxide, diacyl peroxides such as acetyl peroxide, benzoyl peroxide, lauroyl peroxide; metal alkyls, e.g., sodium ethyl, potassium amyl, lead tetraethyl and lead tetraphenyl; alkali and ammonium persulfates, perborates, and percarbonates, molecular oxygen; alpha, alpha'-azobis(alpha-alkylalkanoic) acids and derivatives hydrolizable thereto such as the nitrile, ester and amide, e.g., alpha, alpha'-azobisisobutyric acid, alpha, alpha'-azobisisobutyronitrile, and alpha, alpha'-azobis(alpha-methylbutyronitrile); amine oxides, e.g., trimethyl amine oxide, triethyl amine oxide and dimethyl aniline oxide; dibenzoyl hydrazine; hydrazine salts such as hydrazine dihydrochloride and hydrazine sebacate; ultraviolet light especially in the presence of such photo sensitizers as mercury, alkyl iodides, benzoin and acetone. The peroxygen compounds are usually preferred particularly the diacyl peroxides and the alkali and ammonium persulfates. The catalyst is used in amounts varying from about 0.0001 to about 15 percent by weight of the reactants. The preferred range when employing peroxygen catalyst being 0.01 to 0.5 percent by weight.

The ratio of bromo compound i.e. acid, ester or anhydride, to the olefin employed in the reaction of this invention, while not critical, is important. Generally, the average chain length of the product mixture depends on the relative concentration of olefin and bromo compound with an increase in the mole ratio of bromo compound to olefin resulting in a decrease in the average molecular weight of the product obtained. It is generally preferred to use 1 to 5 parts by weight of bromo compound per part of olefin charged in the reactor. Molar ratios of bromo compound to olefin from 1:10 to 40:1 and preferably from 1:1 to 15:1 can be employed to achieve the desired selective production of a narrow spectrum of omega bromo carboxy compounds.

The reaction may be carried out in the absence or presence of an inert diluent, such as for example, an inert gas e.g. nitrogen or argon, or more preferably in the form of a liquid material which is inert under reaction conditions. Operation of the process in the absence of any inert solvent is generally preferred because of simpler recovery procedure which can be employed as well as because of the excellent results obtained. When desired, however, such solvents as aliphatic, cycloaliphatic and aromatic hydrocarbons, aliphatic and cycloaliphatic ethers and the like can be employed. Hydrocarbon solvents are generally preferred since they are operable over a wide range of temperature conditions without effecting any side reactions with the reactants involved, this being particularly true of the aliphatic and cycloaliphatic hydrocarbons. It must be recognized that such solvents serve a dual purpose of providing adequate heat removal means as well as effecting the same result in product distribution as is obtained with an increase in the reaction pressure of the gaseous olefin. Generally, the load on a heat transfer medium is proportional to the concentration or relative proportion of the reactant or carrier. The use of from about 25 to 2000 parts of solvent per mole of bromo compound being employed is recommended as a suitable reaction dilution in those embodiments of this invention where the use of a solvent is desired.

As heretofore noted the products of this invention are extremely useful as synthetic intermediates for the production of a wide variety of useful products. Thus, gamma-bromobutyric acid or its esters can be conveniently converted to gamma-butyrolactone and hydrogen bromide or an organo bromide by the use of elevated temperature, generally above about 140° C. The lactone can be aminated and thiomethylated to form the valuable amino acid, methionine. The organo bromide co-products, particularly methyl bromide, are useful as fumigants but can be modified to form other useful products. The valuable fire-extinguishing compound, bromochloromethane can be obtained by chlorination of the methyl bromide. Brominated ethanes can be conveniently prepared by reacting methyl bromide with ethylene dichloride in the presence of a redistribution catalyst. Salts and particularly the halides, of the transition series metals have been found to be exceptionally effective as redistribution catalysts. Methyl bromide can also be employed as a methylating agent in the preparation of trimethylaluminum. The reaction of metallic aluminum with methyl bromide at reaction temperatures above the boiling point of trimethylaluminum results in the distillation of trimethylaluminum from the reaction zone.

Alternatively, the omega-bromo compounds obtained by the present process can be converted to the corresponding omega-chloro compounds by various routes, a particularly effective one being the reaction with hydrogen chloride or sulfuryl chloride. The gamma-chlorobutyric compounds formed thereby can also be transformed to the gamma lactone and hydrogen chloride or the corresponding organo chloride. The higher omega-bromoacids and esters, i.e., hexanoic and above, and the corresponding chloro compounds follow an entirely novel and unexpected course when subjected to elevated temperatures. Contrary to all expectations, these materials in the presence of elevated temperatures condense to form hydrogen halide or organo halide as well as halopolyesters having the formula $X[(CR^1R^2—CR^3R^4)_nCH_2COO]_mR^5$ where $R^1R^2R^3R^4R^5$ are as defined before, $n$ and $m$ have values generally greater than 1 and X is chlorine or bromine. While the condensation process can be conducted in the absence of any catalysts or process promoters, these can be employed when desired. Suitable catalysts for this condensation process comprise the salts of metals in the transition series of the periodic table. These halo-polyesters can be hydrolyzed to the corresponding hydroxy acid $$OH(CR^1R^2—CR^3R^4)_nCH_2COOH$$

or a salt thereof which can be oxidized to the corresponding dibasic acid. Thus adipic acid can be prepared via this route from the epsilon-chloro or bromo derivatives of hexanoic acid or its esters. Still another route to the dibasic acid comprises the direct oxidation of the halo polyesters. In a similar fashion long chain, higher molecular weight dibasic acids suitable for use as synthetic lubricants can be prepared from the omega-chloro or bromo derivatives of the higher acids i.e. more than 6 carbon atoms, or esters thereof.

Another novel route to the preparation of dibasic acids involves the steps of preparing the omega-bromo compounds by the present invention and coupling two molecules with the accompanying loss of the bromine substituents. The coupling reaction is generally carried out in the presence of an active metal such as a metal in groups I, II, III and VIII of the periodic table. Thus, dioctyl suberate can be prepared from methyl gamma-bromobutyrate by refluxing in a hydrocarbon solvent in the presence of finely divided metallic iron and transesterifying the dimethyl suberate with octyl alcohol. Similar process steps can be applied to the higher omega-bromo acids or the corresponding chloro compounds.

The omega-bromo acids or esters of this invention can be further converted to the corresponding omega thioacid or ester by several routes. One preferred route includes the formation of the thiouronium salt by reaction with thiourea in an acid medium and cleavage of this salt to give the thioacid or ester. The preparation of thiobutyric acid from methyl gamma-bromobutyric acid is an example of such a process. Another route to this product involves a reaction of the omega-bromo compound with a metallo hydrogen sulfide e.g. NaSH.

The halopolyesters described above can be further modified to replace the halide substituent with an alkoxy group to obtain synthetic lubricants or viscosity index improvers for lubricants. If desired, the halide substituent can be replaced with a carboxy function i.e. $[R^6COO]^-$, where $R^6$ is an organic radical. Products so formed are very effective as plasticizers, particularly for the polyester, polyamide, polyvinyl halide, and polyurethan type of polymeric materials.

The process of this invention now also provides a novel and economical route to a whole series of the commercially valuable family of amino acids. The omega-bromo compounds produced herein can be readily converted to the desired amino acid by various suitable routes. Thus, epsilon-bromohexanoic acid or its esters can be chlorinated to the alpha-chloro, omega-bromo compound which is subsequently animated to produce lysine, a valuable feed supplement. If desired, the omega-bromo compound can be converted to the corresponding omega-chloro compound which is also suitable as an intermediate in the preparation of these amino acids. The particular chlorination and amination process routes employed can vary widely without departing from the scope of the combined process operation disclosed herein. Thus, the omega-bromo or chloro compound can be chlorinated with phosphorous or phosphorous trichloride or pentachloride and chlorine, generally in the absence of any inert solvent and at low to moderate temperatures i.e. 25–80° C., to give the alpha-chloro derivative. Another route visualizes a chlorination step employing thionyl or sulfuryl chloride either in the presence or absence of free chlorine as a chlorinating agent. The aminolysis step generally involves the reaction of the alpha, omega-halo compound with an aqueous ammonia solution at moderate temperatures e.g. 50–150° C., for about 0.25 to 12 hours. If desired a catalyst such as the salts of metals in groups I and II of the periodic table can be employed. The unreacted $NH_3$ is distilled off at the end of the reaction period, the solution neutralized and the ammonium bromide or chloride salts contained therein are removed from the system by passing the aqueous solution through an ion exchange resin such as for example the commercially available Amberlite IR–4B. The purified solution is then evaporated to deposit the desired lysine hydrochloride.

The present process also provides a novel and improved route to the preparation of the valuable monomer, caprolactam, through the products formed therein. Thus, the omega-bromo compounds of the present process and the corresponding omega-chloro compounds can be reacted with an aqueous solution of ammonia, generally at moderate temperatures e.g. 50–200° C., to give the corresponding lactam. When epsilon-bromo or chloro hexanoic acid or its esters are so aminated, caprolactam is the product obtained. Caprolactam by subsequent treatment with some hydroxy containing material e.g. $H_2O$, an alcohol, produces the very desirable polymer, nylon-6.

Still another valuable monomer, aminoheptanoic acid, can be prepared via this improved route from epsilon-bromo hexanoic acid or its corresponding epsilon-chloro compound. The process involves the reaction of the halo compound with a metal cyanide, e.g. NaCN, in the presence or absence of a solvent to yield the pimelo-half nitrile acid or ester. This material is subsequently catalytically hydrogenated to give the desired amino heptanoic acid or ester which can be condensed to the very desirable polymeric material known as nylon 7.

Alpha, omega diamines, such as for example penta-methylene-diamine, hexamethylenediamine and the like, can be prepared by the novel and improved routes disclosed herein. Thus, the omega-halo acids or esters can be reduced to the corresponding amides which are subsequently dehydrated and hydrogenated to the corresponding omega-halo amine. The ammonolysis of this material results in the formation of the desired alpha, omega diamine.

In all of the above subsequent reactions of the omega-bromo compounds of the present invention, bromine in the form of hydrogen bromide or organo bromide is released. A novel process combination involves the process steps of recycling the hydrogen bromide to a reaction step with glycolic acid or an ester thereof to produce bromoacetic acid by the novel technique of removing water from the reaction system as it is formed without any substantial carryover of the hydrogen bromide. This novel concept permits the maintenance of a high concentration of hydrogen bromide in the reaction zone in the form of a constant boiling mixture of water and hydrogen bromide thereby effectively improving the yields and space-time production of bromoacetic acid or ester. The bromoacetic compound so-formed is reacted by the present process to the desired omega-bromo compounds which are subsequently reacted to the desired derived products, noted above, while forming hydrogen bromide to be recycled to the first step i. e. preparation of the bromoacetic compound. This completely cyclic operation can be effectively controlled so that additional expensive bromine need never be introduced into the cycle thereby effecting a considerable economic improvement over the prior art. In all of the above processes where an organo bromide is recovered, it can be suitably converted to the desired hydrogen bromide for use in the unique process combination disclosed herein.

It will be understood that various modifications and alterations of conditions and techniques obvious to those skilled in the art may be made in this invention without departing from the scope thereof.

I claim:
1. A process for intermolecular condensation to provide omega bromo polyester compounds which comprises heating at a temperature of about 200° C. an omega-bromocarboxylic compound selected from the group consisting of acids and esters, having at least six carbon atoms in the chain thereof and prepared by the reaction of a bromo acetic acid with ethylene in the presence of a free radial initiating catalyst.

2. A process for the manufacture of omega bromo polyester which comprises heating methyl-epsilon-bromo-hexanoate to a temperature of about 200° C. for a period of about 12 hours.

References Cited in the file of this patent

UNITED STATES PATENTS

| | | |
|---|---|---|
| 2,298,138 | Loder | Oct. 6, 1942 |
| 2,476,668 | Kharasch et al. | July 19, 1949 |
| 2,507,568 | Hanford | May 16, 1950 |

UNITED STATES PATENT OFFICE
CERTIFICATE OF CORRECTION

Patent No. 2,880,220 March 31, 1959

James D. Johnston

It is hereby certified that error appears in the printed specification of the above numbered patent requiring correction and that the said Letters Patent should read as corrected below.

Column 5, line 55, the formula should appear as shown below instead of as in the patent:

$$CR^1R^2 = CR^3R^4$$

Signed and sealed this 8th day of September 1959.

(SEAL)
Attest:

KARL H. AXLINE
Attesting Officer

ROBERT C. WATSON
Commissioner of Patents